United States Patent [19]
Iwasawa

[11] Patent Number: 6,116,675
[45] Date of Patent: Sep. 12, 2000

[54] OVERHEAD CONSOLE

[75] Inventor: Hiroaki Iwasawa, Hino, Japan

[73] Assignee: Hino Jidosha Kogyo Kabushiki Kaisha, Tokyo, Japan

[21] Appl. No.: 09/149,038

[22] Filed: Sep. 8, 1998

[30]     Foreign Application Priority Data

Dec. 1, 1997   [JP]   Japan .................................. 9-330357

[51] Int. Cl.⁷ ................................................. B60N 3/12
[52] U.S. Cl. ........................ 296/37.8; 296/37.7; 224/309
[58] Field of Search ................................ 296/37.7, 37.8; 224/309

[56]              References Cited

U.S. PATENT DOCUMENTS

| | | | |
|---|---|---|---|
| 4,368,937 | 1/1983 | Palombo et al. | 296/37.7 |
| 4,595,228 | 6/1986 | Chu | 296/37.7 |
| 4,867,498 | 9/1989 | Delphia et al. . | |
| 5,050,922 | 9/1991 | Falcoff | 296/37.7 |
| 5,064,974 | 11/1991 | Vigneau et al. . | |
| 5,388,880 | 2/1995 | Kinane | 296/37.8 |
| 5,441,326 | 8/1995 | Mikalonis | 296/37.7 |
| 5,507,423 | 4/1996 | Fischer et al. | 296/37.7 |
| 5,522,638 | 6/1996 | Falcoff et al. | 296/37.8 |
| 5,593,203 | 1/1997 | Abbott | 296/37.7 |
| 5,775,761 | 7/1998 | Asami et al. | 296/37.8 |
| 5,887,929 | 3/1999 | Miller et al. | 296/37.7 |

FOREIGN PATENT DOCUMENTS 0262442  10/1990   Japan .................................. 296/37.7

*Primary Examiner*—Joseph D. Pape
*Assistant Examiner*—Kiran Patel
*Attorney, Agent, or Firm*—Oblon, Spivak, McClelland, Maier & Neustadt, P.C.

[57]              ABSTRACT

An overhead console which can be used to accommodate small objects and also to accommodate a remote controller of a garage opener. The overhead console has a latch mechanism for engaging a free end of the cover with the console body to prevent the free end of the cover from falling off when the cover is closed while allowing upward displacement of the cover by a given stroke from the engagement position, as well as a projection arranged in position on an inner surface of the cover. A switch of the remote controller detachable attached to a ceiling of an accommodation chamber can be operated by pushing the cover upward.

4 Claims, 3 Drawing Sheets

OVERHEAD CONSOLE

BACKGROUND OF THE INVENTION

1. Field of the Invention

The present invention relates to an overhead console on a ceiling inside an automobile.

2. Discussion of the Background

Conventionally, for some types of automobiles having higher ceilings, an overhead console has been provided on a ceiling at its forward center. In Japan, this type of overhead console has been generally used as a container for small objects such as sunglasses. On the other hand, in Europe and U.S.A. where a garage opener is widely propagated to open a garage door by remote control while a driver remains in an automobile, the overhead console is often used as a container for a remote controller of the garage opener.

For use of the remote controller in the overhead console to open the garage, an indirect operating mechanism must be added to a cover of the overhead console so as to operate from outside a switch of the remote controller in the overhead console. This addition substantially makes the overhead console exclusive for a remote controller of a garage opener and makes it impossible to use components in common for overhead consoles for such different purposes, i.e., overhead consoles for small objects and for a remote controller, respectively. The two different types of overhead consoles are required depending upon use, which results in an extensive increase in manufacturing cost of the overhead consoles.

The invention was made in view of the above and has its object to provide an overhead console which can be used to accommodate small objects and also to accommodate a remote controller of a garage opener and can be produced at lower cost.

BRIEF SUMMARY OF THE INVENTION

The overhead console according to the invention comprises a console body having a downwardly opened accommodation chamber and mounted in position on a ceiling in an automobile, a cover tiltably pivoted to the console body so as to enclose the accommodation chamber, a latch mechanism for engaging a free end of the cover with the console body to prevent the former from falling off when the cover is closed while allowing upward displacement of the cover by a given stroke from the engagement position, and a projection arranged in position on an inner surface of the cover.

With this arrangement, when a remote controller for a garage opener is attached to a ceiling of the accommodation chamber of the console body and the cover is closed, the switch of the remote controller can be operated by pressing the cover upward to press the projection. Thus, there is no need of providing an indirect operating mechanism on the cover of the overhead console. The console may also be used to accommodate small objects when the remote controller is removed.

According to the invention, the latch mechanism may comprise latches on the free end of the cover for abutment on a rearward wall of the accommodation chamber of the console body when the cover is closed, and catches arranged on the rearward wall of the chamber of the console body for receiving and preventing the latches from falling off and for releasing the engagement when the catches are bent in a direction away from the latches. A predetermined movable space is ensured between the latches engaged with the catches and the ceiling of the accommodation chamber.

Further, according to the invention, preferably a cushion is arranged to urge the cover to the engagement position for the latch mechanism when the cover is closed. This will avoid inconveniences such as rattling of the cover due to vibration caused by movement of the automobile during driving.

An embodiment of the invention will be described in conjunction with the drawings.

DESCRIPTION OF THE PREFERRED EMBODIMENT

Figure 1:
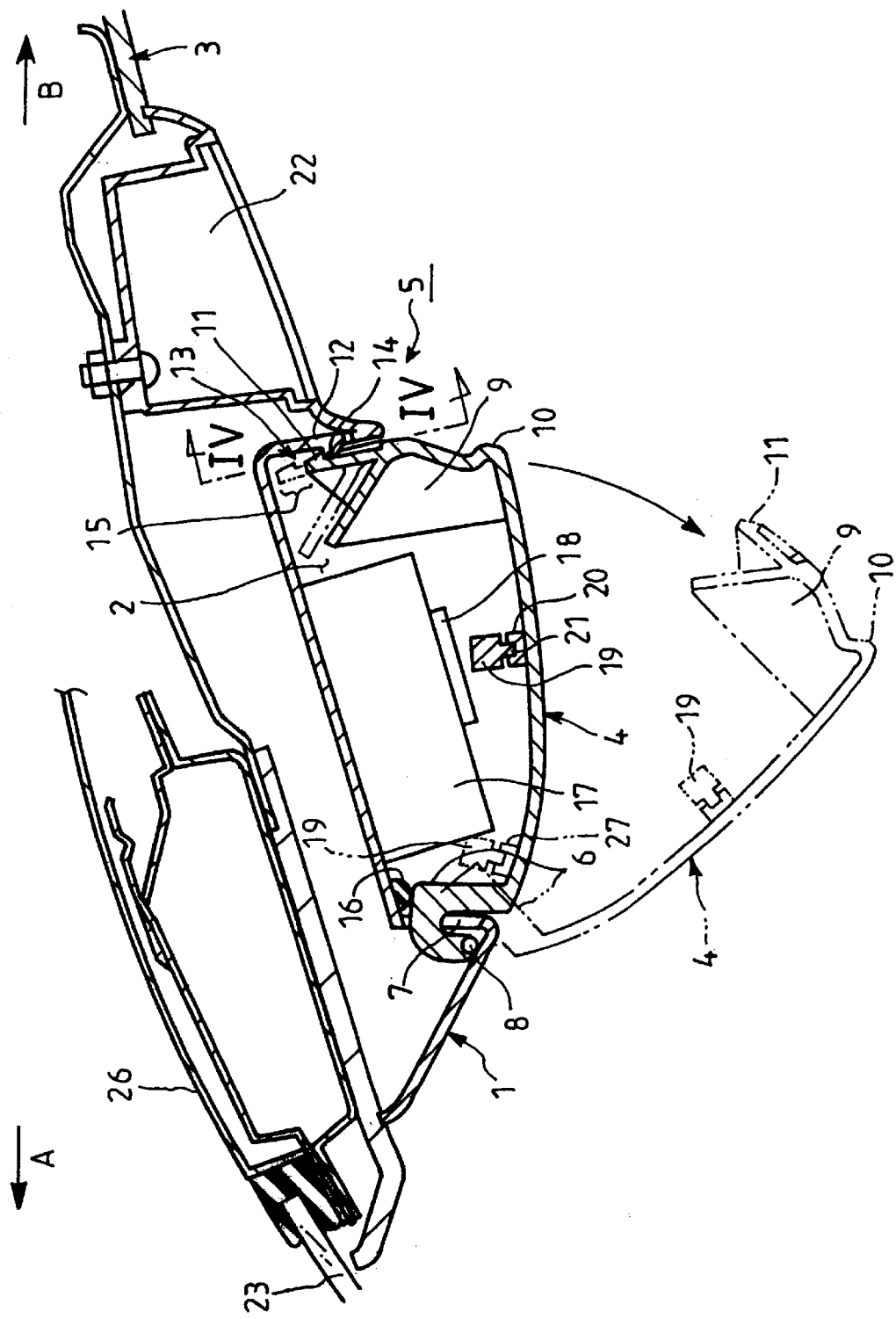
FIG. 1 is a vertical section of an embodiment of the invention.
Figure 2:
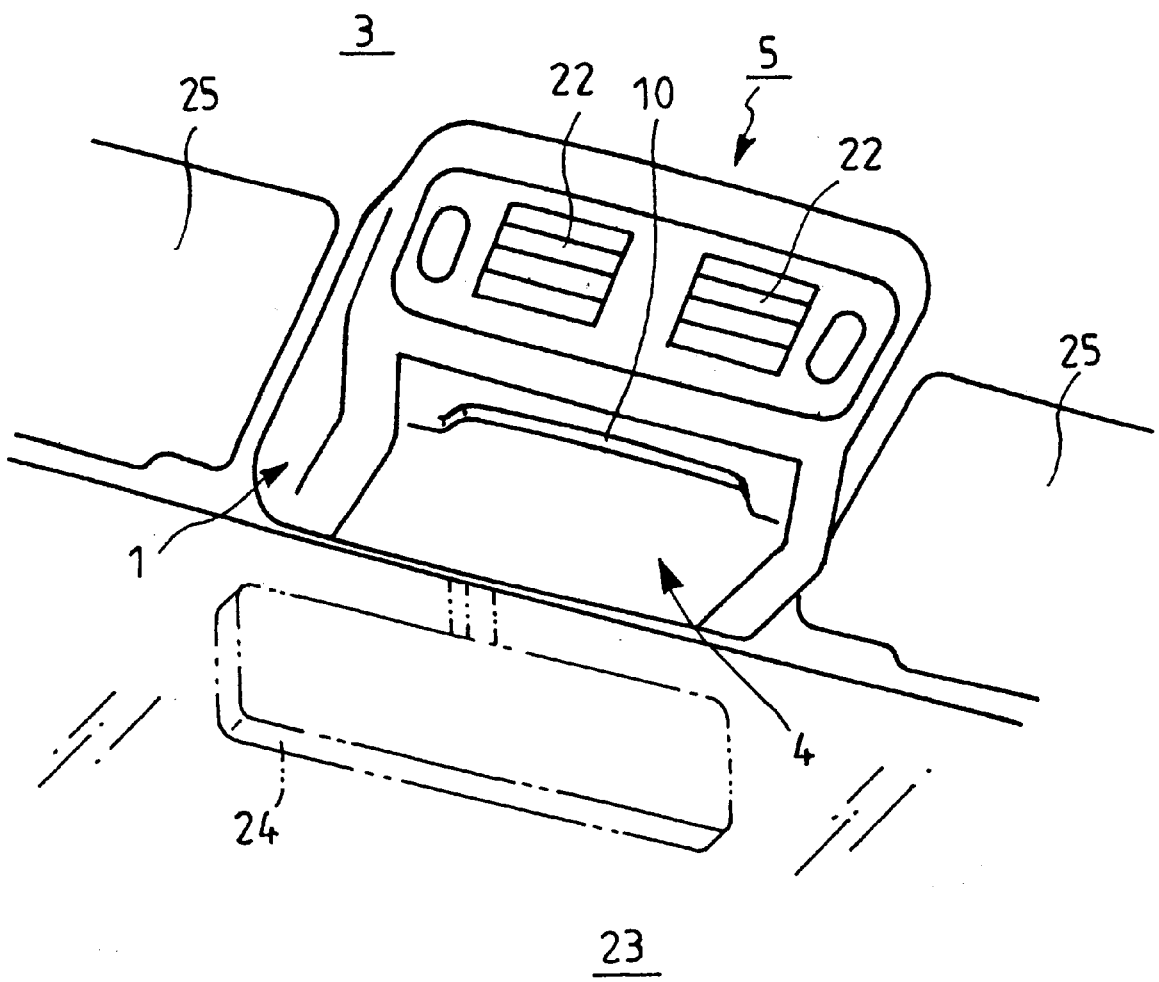
FIG. 2 is a perspective view of the overhead console shown in FIG. 1 as it is seen obliquely from below.
Figure 3:
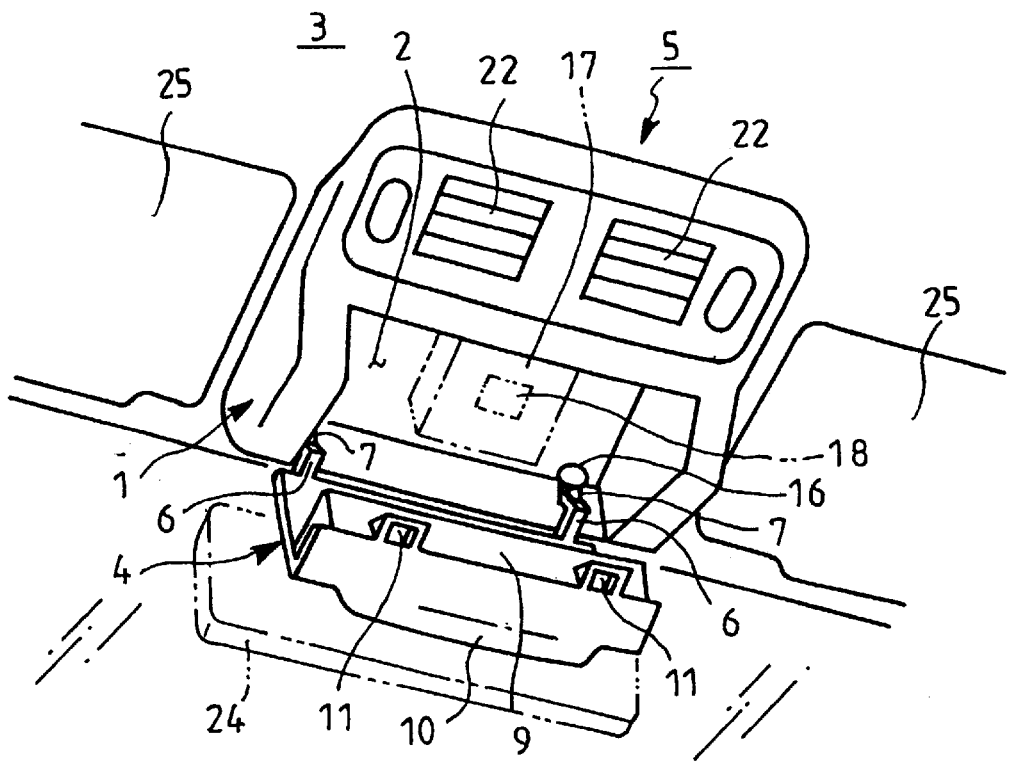
FIG. 3 is a perspective view of the overhead console of FIG. 2 with its cover opened.

In the description relating to FIGS. 1 to 4 as given below, the terms "forward" and "rearward" refer to directions shown by arrows A and B in FIG. 1, respectively.

In the figures, reference numeral 1 represents a console body having a downwardly opened accommodation chamber 2 and mounted on a forward center of a ceiling 3 in an automobile. A cover 4 is tiltably pivoted to the console body 1 so as to enclose the chamber 2. Thus, the cover 4 and console body 1 provide an overhead console 5.

The cover 4 is formed, at its forward end, with a hook-like bracket 6 which extends out of the chamber 2 through a slit 7 on a forward wall of the chamber 2 and which is pivotally supported via a hinge 8. The cover 4 is also formed, at its rearward free end, with a bucket 9 which prevents the object or objects in the chamber from dropping when the cover 4 is opened by tilting the same about the hinge 8. The bucket 9 is formed, at its portion which is directed rearward when the cover 4 is closed, with an operational convex portion 10 which is used to pull up or push down the cover 4 using an operators fingers. The bucket 9 is also formed, at its upper portion which is hidden into the chamber 2 when the cover 4 is closed, with a pair of latches 11 for abutment on a rearward wall of the chamber 2 of the console body 1. The rearward wall of the chamber 2 of the console body 1 is formed with catches 12 which may engage with the latches 11 to prevent the same from falling off when the cover 4 is closed and which may be bent rearwardly to release the engagement when the cover 4 is vigorously pulled down. Thus, the latches 11 and catches 12 provide a latch mechanism 13 to maintain the cover 4 in closed state.

Figure 4:
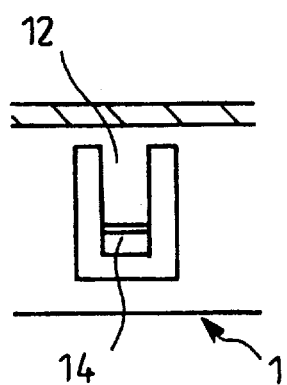
FIG. 4 is a view taken in the direction of arrows IV in FIG. 1.

Particularly as shown in FIG. 4, the catches 12 may be formed as rearwardly bendable tongues by cutting in U-shape the rearward wall of the chamber 2 of the console body 1. Each of the tongues may have at its lower end a claw 14 for engagement with the corresponding latch 11.

The engagement of the latches 11 on the cover 4 with the claws 12 on the console body 1 hinders the cover 4 from being downwardly displaced. Upward displacement of the cover 4 for a given stroke from the engagement position is allowed because of a predetermined movable space 15 (FIG. 1) ensured between the latches 11 in engagement with the catches 12 and a top of the chamber 2.

Further, according to the embodiment, a rubber cushion 16 is disposed on a forward end of the ceiling of the chamber 2 and immediately above the bracket 6 of the cover 4 so as to urge the cover 4 to the predetermined engagement position by the resilient force of the cushion 16.

A projection 19 is arranged on an inner surface of the cover 4 so as to operate a switch 18 of a remote controller 17 of a garage opener, the remote controller 17 being detachably attached to the ceiling of the accommodation chamber 2 of the console body 1. Particularly in the embodiment, the projection 19 is detachably mounted on the inner surface of the cover 4. More specifically, the projection 19 is formed, at its bottom, with a convex number 21 which is fitted into a recess 20 on the inner surface of the cover 4.

Preferably, a plurality of recesses 20 are arranged at different points on the inner surface of the cover 4 so that the position of the projection 19 on the inner surface of the cover 4 may be selected depending upon the position of the switch 18 so as to conform to differences of kinds of remote controllers 17 used. Such detachable mounting of the projection 19 on the inner surface of the cover 4 is convenient in that the space of the accommodation chamber 2 can be more fully utilized for accommodation of small objects when the remote controller 17 is removed from the chamber 2. The projection 19 detachable for disuse out of the operational position may be fitted into a recess 27 for storage.

Preferably, mounting of the remote controller 17 on the ceiling of the chamber 2 is effected by readily detachable means such that the positional relationship between the projection 19 and the switch 18 of the remote controller 17 can be adjusted. For example, the detachable means may be a Velcro (trademark) tape or loop fastener having paired portions with loops and hooks, one of such portions that has loops or hooks being adhered to a rear surface of the remote controller 17 away from the switch 18 while the other of the paired portions is adhered to the ceiling of the accommodation chamber 2.

In the figure, reference numeral 22 represents a map lamp arranged rearwardly of the chamber 2 on the console body 1; 23, a windshield; 24, a rearview mirror; 25, a sun visor; and 26, a roof.

In the overhead console 5 with the above-mentioned arrangement, when the remote controller 17 for the garage opener is attached to the ceiling of the accommodation chamber 2 of the console body 1 and the cover 4 is closed, the switch 18 of the remote controller 17 can be operated by pressing the cover 4 upward to press the projection 19. Thus, there is no need of providing an indirect operating mechanism on the cover 4 of the overhead console 5. The console 5 may also be used to accommodate small objects when the remote controller 17 is removed.

Accordingly, there is no need of having different types of overhead consoles 5 for use, i.e., overhead consoles used to accommodate small objects and overhead consoles used to accommodate a remote controller 17 for a garage opener. This makes it possible to use components in common for overhead consoles for different purposes and contributes to extensive reduction in manufacturing costs.

When it is used to accommodate a remote controller 17 of a garage opener, there is no need to provide an indirect operating mechanism on the cover 4. Compared with a conventional overhead console exclusively used for accommodation of a remote controller for a garage opener, an overhead console according to the invention can reduce the number of components used and improve the external appearance of the cover 4.

Further, in the embodiment, the cushion 16 is provided to urge the cover 4 to the engagement position using the latch mechanism 13 when the cover 4 is closed. This makes it possible to avoid inconveniences such as rattling of the cover 4 due to vibration caused by movement of the automobile during driving.

It is to be understood that an overhead console according to the invention is not limited to the above embodiment and that various changes and modifications may be made without departing from the spirit and the scope of the invention.

What is claimed is:

1. An overhead console comprising a console body having a downwardly opened accommodation chamber and mountable in position on a ceiling in an automobile, a cover tiltably pivoted to the console body so as to enclose the accommodation chamber, said cover having a free end with a bucket to prevent an object positionable in the chamber from dropping during opening of the cover, a latch mechanism positioned on said free end for engaging said free end of the cover with the console body to secure the free end of the cover to the console body when the cover is closed while allowing upward displacement of the cover by a given stroke from an engagement position wherein said latch mechanism comprises at least one latch located on said free end of the cover, and at least one catch is arranged on the rearward wall of the chamber of the console body for engaging with and preventing the at least one latch from disengaging from said at least one catch, such that a movable space is formed between said at least one latch engaged with the at least one catch and the ceiling of the accommodation chamber and wherein said latch comprises a continuation of said free end of said cover.

2. An overhead console according to claim 1, further comprising a cushion for urging said cover to the engagement position using the latch mechanism when the cover is closed.

3. An overhead console according to claim 1, further comprising a cushion for urging said cover to the engagement position using the latch mechanism when the cover is closed.

4. An overhead console according to claim 1, wherein said cover has a bracket which is pivotably connected to said cover and wherein said latch extends upwardly from said free end of said cover a distance greater than a height dimension of said bracket, said latch including a flange member which extends rearwardly towards a chamber so as to form said bucket.

* * * * *

UNITED STATES PATENT AND TRADEMARK OFFICE
CERTIFICATE OF CORRECTION

PATENT NO. : 6,116,675

DATED : September 12, 2000

INVENTOR(S): Hiroaki IWASAWA

It is certified that an error appears in the above-identified patent and that said Letters Patent is hereby corrected as shown below:

On the Title page, Item [75], the Inventor's city of residence, is incorrectly listed; and the CPA information has been omitted.

Item [75] should read as follows:

--- [75] Inventor: Hiroaki Iwasawa, Tokyo, Japan ---

The CPA information should read as follows:

--- [ 45 ] Date of Patent: * Sep. 12, 2000 ---

--- [ * ] Notice: This patent issued on a continued prosecution application filed under 37 CFR 1.53(d), and is subject to the twenty year patent term provisions of 35 U.S.C. 154(a)(2). ---

Signed and Sealed this

Twenty-fourth Day of April, 2001

*Attest:*

NICHOLAS P. GODICI

*Attesting Officer*    *Acting Director of the United States Patent and Trademark Office*